(12) United States Patent
Aoki et al.

(10) Patent No.: US 11,548,449 B2
(45) Date of Patent: Jan. 10, 2023

(54) DISPLAY APPARATUS

(71) Applicant: HONDA MOTOR CO., LTD., Tokyo (JP)

(72) Inventors: Yuki Aoki, Wako (JP); Hisashi Murayama, Wako (JP); Shintaro Masu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 16/788,349

(22) Filed: Feb. 12, 2020

(65) Prior Publication Data

US 2020/0254879 A1 Aug. 13, 2020

(30) Foreign Application Priority Data

Feb. 13, 2019 (JP) .............................. JP2019-023107

(51) Int. Cl.
*B60K 37/02* (2006.01)
*B60R 11/02* (2006.01)

(52) U.S. Cl.
CPC .. *B60R 11/0235* (2013.01); *B60K 2370/1523* (2019.05); *B60K 2370/16* (2019.05); *B60K 2370/172* (2019.05); *B60K 2370/1868* (2019.05); *B60R 2300/8086* (2013.01)

(58) Field of Classification Search
CPC ................ B60K 37/02; B60K 2370/52; B60K 2370/172; B60K 2370/152; B60K 2370/1868; B60K 2370/1523; B60R 11/0235; B60R 2300/8086
See application file for complete search history.

(56) References Cited

U.S. PATENT DOCUMENTS

| 11,164,917 | B1* | 11/2021 | Wang ................ G02F 1/133331 |
| 2002/0054440 | A1 | 5/2002 | Akamine et al. |
| 2016/0311323 | A1* | 10/2016 | Lee .......................... B60K 37/06 |
| 2017/0144544 | A1* | 5/2017 | Fujita ...................... G02F 1/1313 |
| 2018/0210118 | A1* | 7/2018 | Collier .............. G02F 1/133524 |
| 2020/0369223 | A1* | 11/2020 | Hansen .................. B32B 21/14 |

FOREIGN PATENT DOCUMENTS

| JP | 2001-331132 A | 11/2001 |
| JP | 2006-103473 A | 4/2006 |
| JP | 2006-194829 A | 7/2006 |
| JP | 2016-013747 A | 1/2016 |
| JP | 2016-022810 A | 2/2016 |
| JP | 2017-039396 A | 2/2017 |
| JP | 2019-006365 A | 1/2019 |

OTHER PUBLICATIONS

Office Action dated Mar. 15, 2022 issued over the corresponding Japanese Patent Application No. 2019-023107 with the English translation thereof.

* cited by examiner

*Primary Examiner* — Christopher E Leiby
(74) *Attorney, Agent, or Firm* — Carrier Blackman & Associates, P.C.; Joseph P. Carrier; Jeffrey T. Gedeon

(57) ABSTRACT

A display apparatus including a display that has a screen; a wall portion (instrument panel) where the display is attached to an attachment portion; and a display control section that displays an information image showing information to be provided to a user (occupant) in a partial range of the screen, and displays a wall portion image having the same texture, color, or pattern as the wall portion, in a range of the screen in which the information image is not displayed.

10 Claims, 7 Drawing Sheets

DISPLAY APPARATUS

CROSS-REFERENCE TO RELATED APPLICATION

This application is based upon and claims the benefit of priority from Japanese Patent Application No. 2019-023107 filed on Feb. 13, 2019, the contents of which are incorporated herein by reference.

BACKGROUND OF THE INVENTION

Field of the Invention

The present invention relates to a display apparatus in which a display is attached to a wall portion.

Description of the Related Art

In recent years, vehicles have included display apparatuses in which a display is attached to an instrument panel. In such a display device, the instrument panel and the display have different textures, and therefore there is a desire to harmonize these components so as not to impair the aesthetics in the vehicle.

Japanese Laid-Open Patent Publication No. 2001-331132 discloses a display apparatus in which a display is attached to an instrument panel with a woodgrain pattern. In this display apparatus, the front surface of the display is covered with a cover with a woodgrain pattern. A large number of fine holes capable of transmitting display light are formed in the cover. With this display apparatus, it is possible to see the screen through the cover when the display is lit, and it is also possible to hide the screen with the woodgrain pattern cover when the display is unlit. Therefore, the entire instrument panel including the display is unified with a woodgrain pattern.

SUMMARY OF THE INVENTION

In the apparatus of Japanese Laid-Open Patent Publication No. 2001-331132, when the front surface of the display is covered with the cover, the visibility of the image displayed in the display is reduced.

The present invention takes this problem into consideration, and it is an objective of the present invention to provide a display apparatus capable of providing a display apparatus capable of increasing the overall aesthetics without reducing the visibility of the image.

One of the aspects of the present invention is directed to a display apparatus comprising a display that includes a screen; a wall portion where the display is attached to an attachment portion; and a display control section configured to display an information image showing information to be provided to a user in a partial range of the screen, and display a wall portion image having the same texture, color, or pattern as the wall portion, in a range of the screen in which the information image is not displayed.

According to the present embodiment, it is possible to increase the overall aesthetics of the display apparatus, by harmonizing the surface of the wall portion and the screen of the display. Furthermore, since the screen is not covered with the cover or the like, the visibility of the information image is not reduced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes in detail preferred embodiments of a display apparatus according to the present invention, while referencing the accompanying drawings.

[1. Configuration of Display Apparatus 10]

Figure 1:
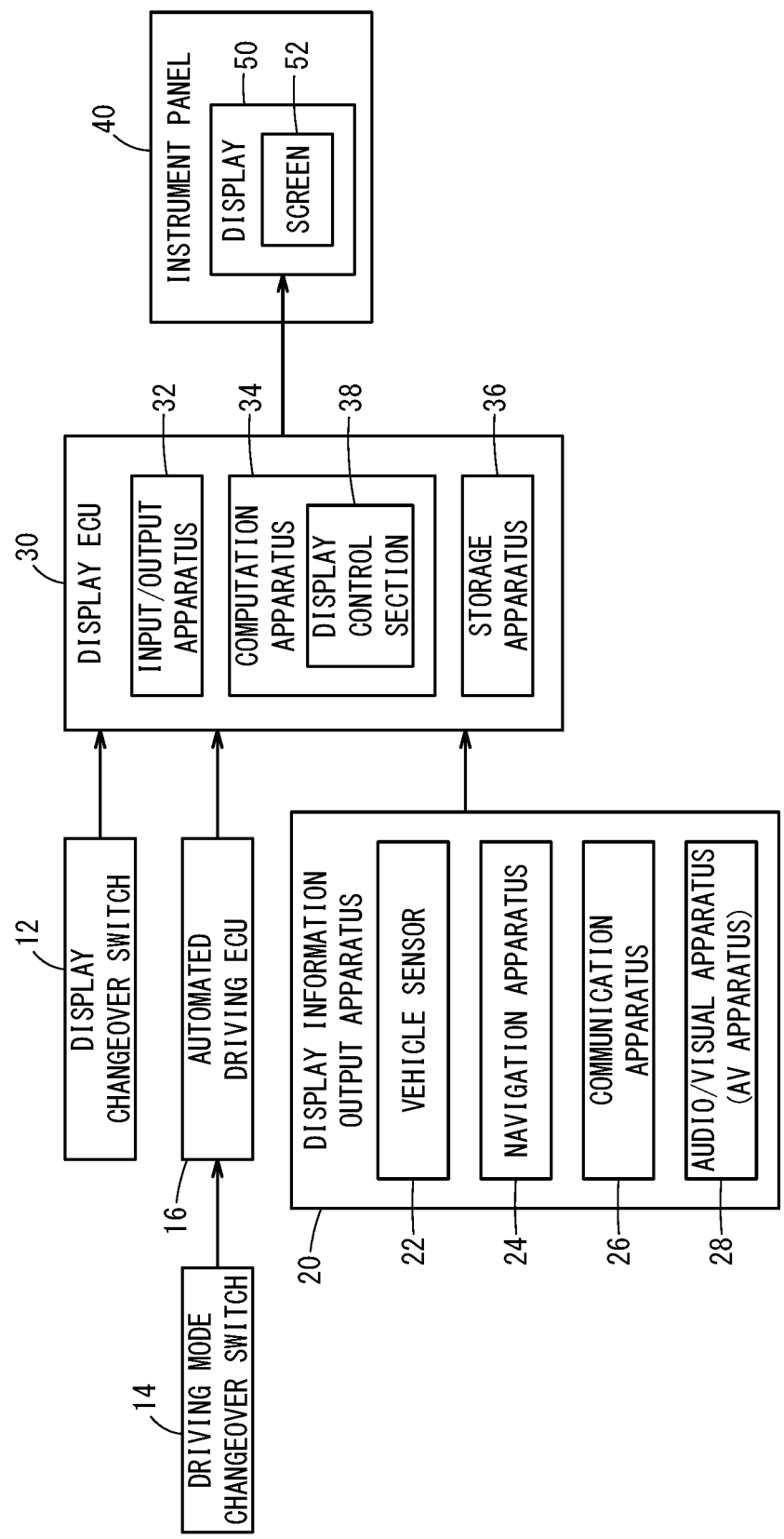
FIG. 1 is a block diagram of a display apparatus according to the present embodiment.
Figure 2:
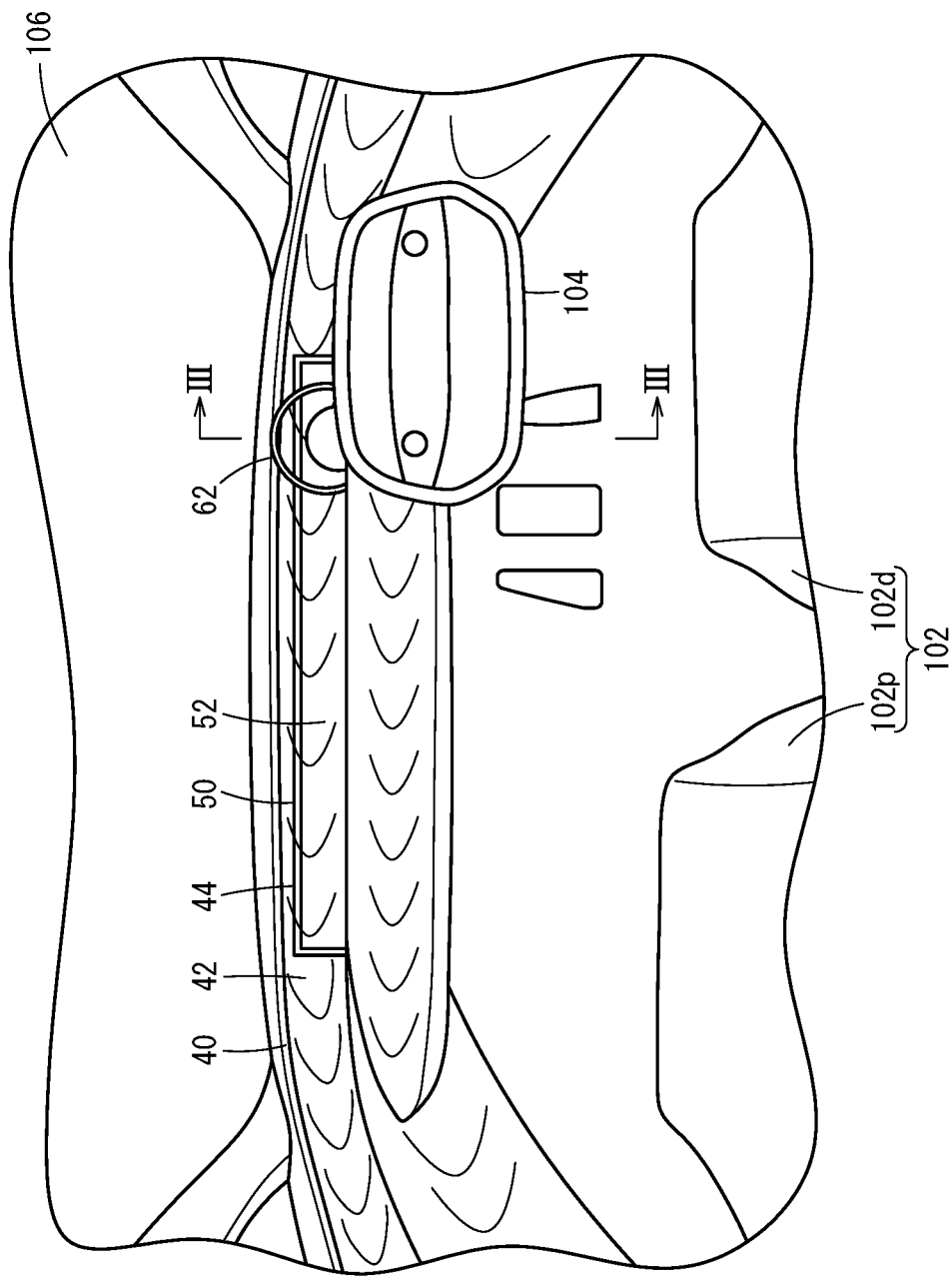
FIG. 2 is an external view of the front of a vehicle as seen from inside the vehicle cabin.
Figure 3:
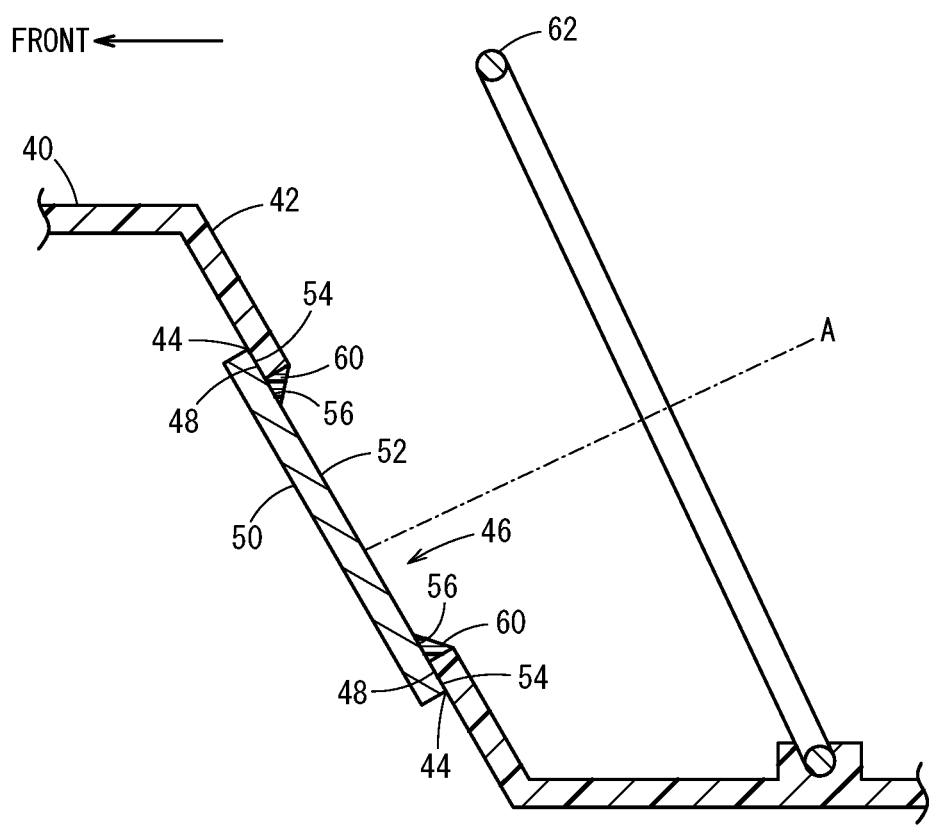
FIG. 3 is a cross-sectional view over the line III-III in FIG. 2.

The configuration of a display apparatus 10 is described using FIGS. 1 to 3. The display apparatus 10 according to the present embodiment is provided in a vehicle 100 (see FIG. 2). In the present embodiment, it is assumed that the vehicle 100 is an automobile capable of switching between manual driving and automated driving. When in the automated driving state, this automobile calculates the optimal travel path and velocity (acceleration and deceleration) corresponding to outside information and vehicle position information detected by various sensors and the like, and controls the travel to realize this travel trajectory and velocity.

As shown in FIG. 1, the display apparatus 10 includes a display changeover switch 12, an automated driving ECU 16, various types of display information output apparatuses 20, a display ECU 30, an instrument panel 40, and a display 50.

The display changeover switch 12 is attached to the instrument panel 40 facing a steering wheel 104 (see FIG. 2) and a driver seat 102d, for example, at a position where the display changeover switch 12 can be manipulated by an occupant (driver) sitting in the driver seat 102d (see FIG. 2). The display changeover switch 12 outputs a display switching signal corresponding to a switching manipulation performed by the occupant, to the display ECU 30.

The automated driving ECU 16 includes an input/output apparatus, a computation apparatus, and a storage apparatus, in the same manner as the display ECU 30, which is described further below. The computation apparatus of the automated driving ECU 16 calculates the travel trajectory and velocity described above, and outputs control information for realizing this travel trajectory and velocity to a drive force output apparatus, control apparatus, and steering apparatus, which are not shown in the drawings. In a case where certain conditions are established or a case where a mode switching signal is output from a driving mode changeover switch 14, the automated driving ECU 16 switches the driving state of the vehicle 100 from an automated driving state to a manual driving state or from the automated driving state to the manual driving state. The automated driving ECU 16 outputs driving state information, which indicates that the driving state of the vehicle 100 is either the automated driving state or the manual driving state, to the display ECU 30.

The display information output apparatus 20 includes various apparatuses that output information to be displayed in the display 50 or information for calculating the information to be displayed in the display 50 to the display ECU 30. For example, the display information output apparatus 20 includes various types of vehicle sensors 22, a navigation apparatus 24, a communication apparatus 26, and an audio/visual apparatus 28.

The vehicle sensor 22 is a sensor that detects the state of each section of the vehicle 100. For example, the vehicle sensor 22 includes a sensor that detects the vehicle wheel velocity and a sensor that detects damage to each section. Furthermore, in a case where the vehicle 100 includes an engine as a drive source, the vehicle sensor 22 includes a sensor that detects the rotational speed of the engine, a sensor that detects the temperature of cooling water, a sensor that detects the temperature of lubrication oil, a sensor that detects the remaining amount of fuel, and the like. Furthermore, in a case where the vehicle 100 includes an electric motor as a drive source, the vehicle sensor 22 includes a sensor that detects the temperature of a battery, a sensor that detects current, a sensor that detects voltage, and the like. The vehicle sensor 22 also includes sensors that detect various types of warning information. Each sensor outputs the detected information to the display ECU 30.

The navigation apparatus 24 includes a manipulation panel that is manipulated by the occupant, a computation apparatus such as a CPU, and a storage apparatus. The navigation apparatus 24 identifies the position of the vehicle 100 using GPS or the like, and references map information stored in a geographic DB or the like to generate a travel route from the position of the vehicle 100 to a destination designated by the occupant. The geographic DB includes store information that indicates the location of stores, types of businesses, and the like. The navigation apparatus 24 outputs the position information of the vehicle 100, route information, store information, and the like to the display ECU 30.

The communication apparatus 26 includes various communication devices (a communication circuit, an antenna, and the like) for wirelessly communicating with external communication apparatuses. The communication apparatus 26 receives broadcast information from televisions, radios, or the like, and outputs the received broadcast information to the audio/visual apparatus 28. Furthermore, the communication apparatus 26 may include a communication apparatus connected to a public network. In this case, the communication apparatus 26 receives various types of information via an external computer network (the Internet) and outputs the received broadcast information to the display ECU 30.

The audio/visual apparatus 28 (also referred to below as an AV apparatus 28) includes a device that reproduces stored information (audio and images) stored in a storage medium and the broadcast information output from the communication apparatus 26. The audio/visual apparatus 28 outputs the audio information to a speaker (not shown in the drawing) and outputs the image information to the display ECU 30.

The display ECU 30 includes an input/output apparatus 32, a computation apparatus 34, and a storage apparatus 36. The input/output apparatus 32 is formed by an A/D conversion circuit, a communication interface, a driver, and the like. The computation apparatus 34 is formed by a processor including a CPU and the like, for example. The computation apparatus 34 functions as a display control section 38, by executing a program stored in the storage apparatus 36. The storage apparatus 36 is formed by a RAM, a ROM, and the like. The storage apparatus 36 stores various pieces of image information and display position information to be used in the image display processes performed by the display control section 38.

As shown in FIG. 2, the instrument panel 40 (dashboard) is an interior member arranged in front of a front seat 102 of the vehicle 100 (the driver seat 102*d* and a passenger seat 102*p*) and below a front window 106. The instrument panel 40 functions as part of a wall portion of a vehicle room. The instrument panel 40 is made of resin, and has an attachment portion 44 that supports the display 50 directly below the front window 106. An opening 46, which faces the front seat 102 and expands in a vehicle width direction at a position in front of the front seat 102, is formed in the attachment portion 44. The surface of the instrument panel 40 (cabin-side surface, also referred to as an in-cabin surface 42) has a prescribed pattern or a certain color, e.g., a woodgrain pattern.

The display 50 is a liquid crystal display, plasma display, organic EL display, or the like that displays the image information output from the display ECU 30 on a screen 52. The screen 52 may be provided with a transparent touch pad. The touch pad functions as a human-machine interface (HMI) for various apparatuses (the navigation apparatus 24, audio/visual apparatus 28, and the like). The display 50 is arranged on a back surface side of the attachment portion 44 (back surface side of the in-cabin surface 42), with the screen 52 facing toward the front seat 102. When the display 50 is attached to the attachment portion 44, an outer edge portion 54 positioned on the outer edge of the screen 52 contacts an inner edge portion 48 that is positioned on the peripheral edge on the back surface side of the attachment portion 44. Furthermore, the screen 52 is exposed in the cabin, through the opening 46. In this way, the screen 52 is arranged farther inward (forward) than the in-cabin surface 42 of the instrument panel 40.

As shown in FIG. 3, an adjacent region 56, which is located closer to the center of the screen 52 than the outer edge portion 54 and adjacent to the outer edge portion 54, is covered with a transparent member 60, that is transparent and made of resin, for example. The adjacent region 56 is adjacent to the in-cabin surface 42 of the instrument panel 40, when viewed from the cabin side. The transparent member 60 is attached along an inner edge portion of the attachment portion 44 that defines the opening 46. The transparent member 60 becomes thinner toward the center of the screen 52.

As shown in FIGS. 2 and 3, an annular ring member 62 is provided on the front surface on the cabin side of the screen 52. The material of the ring member 62 is not particularly specified. The ring member 62 is arranged on the front surface within a range that is desired to be viewed by the person sitting in the driver seat 102*d*. In the present embodiment, the ring member 62 is arranged between the driver seat 102*d* and the screen 52. The ring member 62 is fixed to the instrument panel 40 in a state where the center axis A of the ring member 62 is oriented to intersect with the screen 52. The diameter of the ring member 62 needs at least approximately a length allowing for the entire screen 52 in the vertical direction to be checked when the screen 52 is viewed through the ring member 62 from the driver seat 102d.

[2. Display Control]

Figure 4:
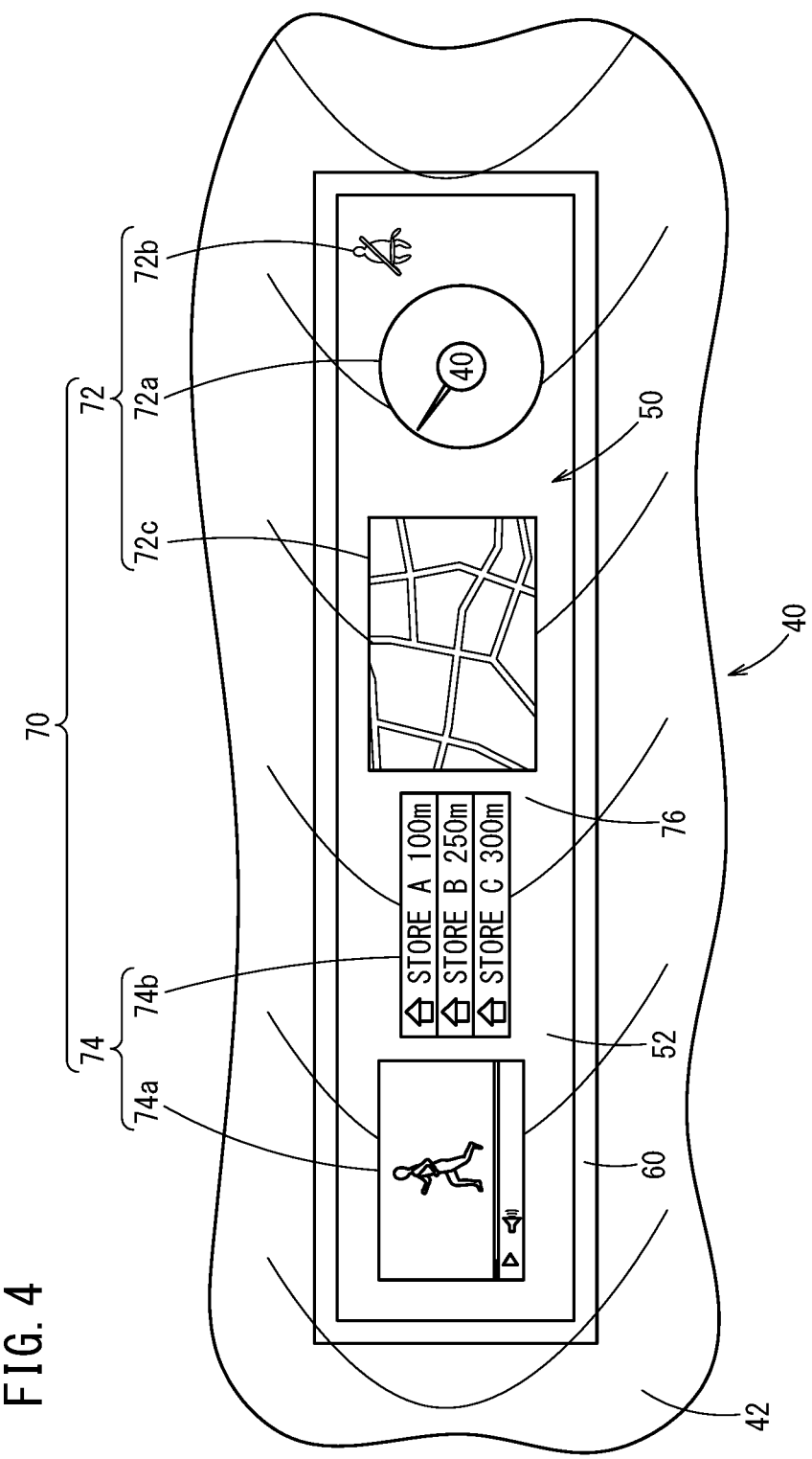
FIG. 4 is a schematic view of each image displayed in each range in the screen.

The display control performed by the display apparatus 10 is described using FIG. 4. Here, a description is provided using an image displayed in the screen 52 as an example.

[2.1. Basic Display Control]

When a start switch (not shown in the drawings) of the vehicle 100 is manipulated and the vehicle 100 transitions from the power source OFF state to the power source ON state, the display control section 38 starts the display control of the display 50.

The display control section 38 displays an information image 70, which shows the information to be provided to the occupant, in a partial range of the screen 52 of the display 50. The information image 70 includes at least one of travel information image 72 relating to travel of the vehicle 100 and preference information image 74 relating to a preference of an occupant.

The travel information image 72 includes a device image 72a that shows a device, a warning image 72b that shows warning information, and a navigation image 72c that shows navigation information (the position of the vehicle 100, a route, a map, a manipulation screen of the navigation apparatus 24, or the like), for example. The screen information showing the device image 72a is generated by incorporating the information output from the vehicle sensor 22 (vehicle wheel velocity or the like) or a computational result (remaining battery amount or the like) based on this information in the image information (image information of a device) stored in the storage apparatus 36. The image information showing the warning image 72b is generated by selecting image information (a warning mark) stored in the storage apparatus 36, based on the warning information output from the vehicle sensor 22. The image information showing the navigation image 72c is generated by incorporating the navigation information (position, route, and the like of the vehicle 100) output from the navigation apparatus 24 in the image information stored in the storage apparatus 36 (image of a map, manipulation indicator of the navigation apparatus 24, screen, or the like).

The preference information image 74 includes a visual image 74a that relates to, for example, the audio/visual apparatus 28 and a store information image 74b that shows guidance information for stores near the vehicle 100. The image information showing the visual image 74a is generated from image information stored in the storage apparatus 36 (a manipulation indicator of the audio/visual apparatus 28, screen, or the like) and the image information output from the audio/visual apparatus 28. The image information showing the store information image 74b is generated by incorporating the store information concerning stores near the vehicle 100 output from the navigation apparatus 24 in the image information stored in the storage apparatus 36 (store guidance image and the like).

The display control section 38 displays a wall portion image 76 that shows the same texture, color, or pattern as the in-cabin surface 42 of the instrument panel 40 in a range within the screen 52 of the display 50 where the information image 70 is not displayed. In the present embodiment, the in-cabin surface 42 is woodgrain, and therefore the wall portion image 76 is also woodgrain. The image information showing the wall portion image 76 is stored in the storage apparatus 36. In a case where the in-cabin surface 42 has a specialized pattern, the wall portion image 76 also has the same specialized pattern as the in-cabin surface 42.

The display ECU 30 outputs a control signal to the display 50, based on the image information showing the information image 70, the image information showing the wall portion image 76, and the display information of each image, which are generated by the display control section 38. The display 50 displays the information image 70 in a partial range of the screen 52 and displays the wall portion image 76 in a range outside the range in which the information image 70 is displayed, in accordance with the control signal.

[2.2. Display Mode Switching Control 1]

In the present embodiment, the display control section 38 may switch the display mode of the screen 52 between a case in which the driving state of the vehicle 100 is the manual driving state and a case in which the driving state of the vehicle 100 is the automated driving state. Two images (a first image 80a and a second image 80b) that the display control section 38 switches between according to the driving state are described using FIGS. 5A and 5B.

Figure 5A:
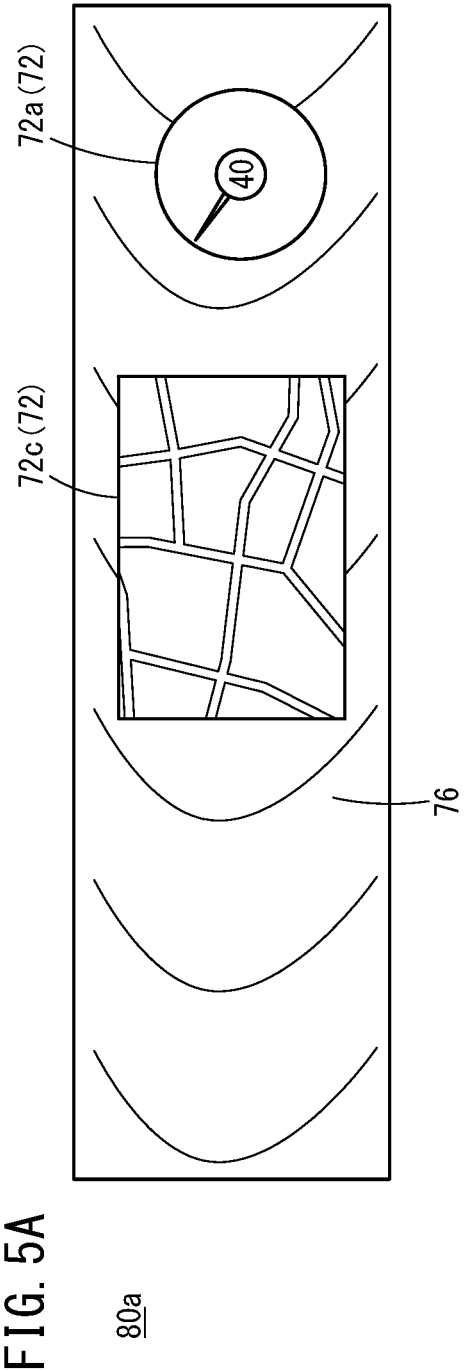
FIG. 5A is a schematic view of a first image displayed in the entirety of the screen during manual driving.
Figure 5B:
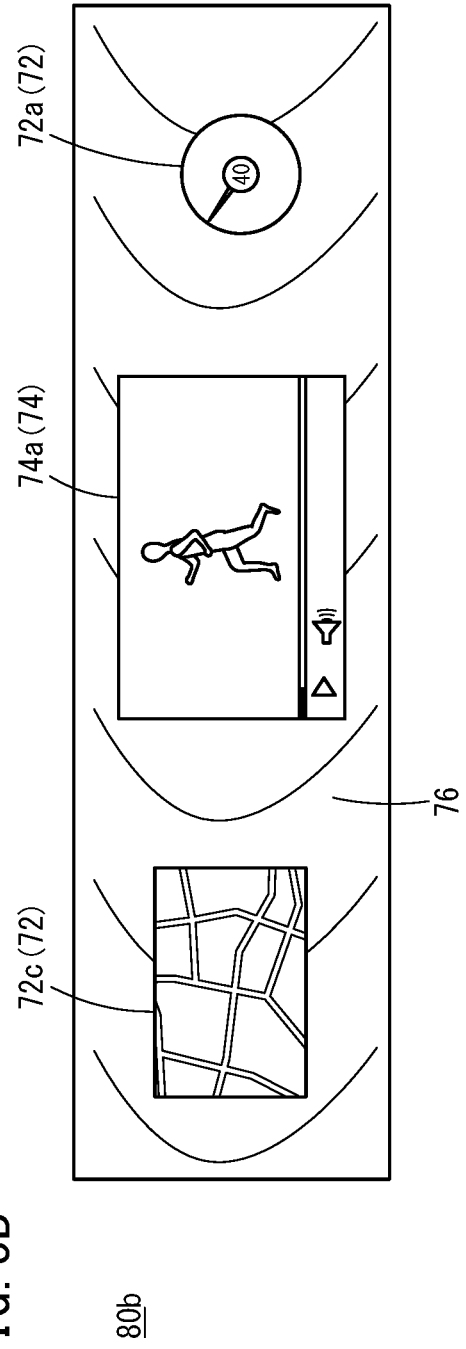
FIG. 5B is a schematic view of a second image displayed in the entirety of the screen during automated driving.

When the start switch (not shown in the drawings) of the vehicle 100 is manipulated or when the driving state of the vehicle 100 is switched, the automated driving ECU 16 outputs driving state information indicating the newest driving state to the display ECU 30. When it is recognized that the driving state is the manual driving state, based on the driving state information, the display control section 38 displays the first image 80a, which is shown in FIG. 5A, in the screen 52 of the display 50. Furthermore, when it is recognized that the driving state is the automated driving state, based on the driving state information, the display control section 38 displays the second image 80b, which is shown in FIG. 5B, in the screen 52 of the display 50.

The first image 80a includes one or more travel information images 72, but does not include the preference information image 74. In other words, the travel information image 72 is in a displayed state, but the preference information image 74 is in a non-displayed state. In the first image 80a, for example, the device image 72a is arranged on the right side in the vehicle width direction (in front of the ring member 62), and the navigation image 72c is arranged in the center in the vehicle width direction. The device image 72a is set to have a size such that the entirety thereof is contained within the ring member 62, as seen from the driver seat 102d, for example.

The second image 80b includes one or more travel information images 72 and one or more preference information images 74. In other words, the travel information image 72 and the preference information image 74 are in the displayed state. In the second image 80b, for example, the device image 72a is arranged on the right side in the vehicle width direction (in front of the ring member 62), the visual image 74a is arranged in the center in the vehicle width direction, and the navigation image 72c is arranged on the left side in the vehicle width direction (in front of the passenger seat 102p). The display area of the device image 72a in the second image 80b may be narrower than the display area of the device image 72a in the first image 80a. Furthermore, the display area of the navigation image 72c in the second image 80b may be narrower than the display area of the navigation image 72c in the first image 80a. The display position and display area of each image included in the first image 80a and the second image 80b are stored in advance in the storage apparatus 36. The display position and display area of each image can be altered in response to a manipulation of the HMI (touch pad or the like) by the occupant. This is also true for the switching controls 2 and 3 described below.

[2.3. Display Mode Switching Control 2]

In the present embodiment, the display control section 38 may switch the display position or display area of an image when a display switching signal output by the display changeover switch 12 is detected. The following describes two images (a third image 80c and a fourth image 80d) that the display control section 38 switches between in response to detecting the display switching signal, using FIGS. 6A and 6B.

Figure 6A:
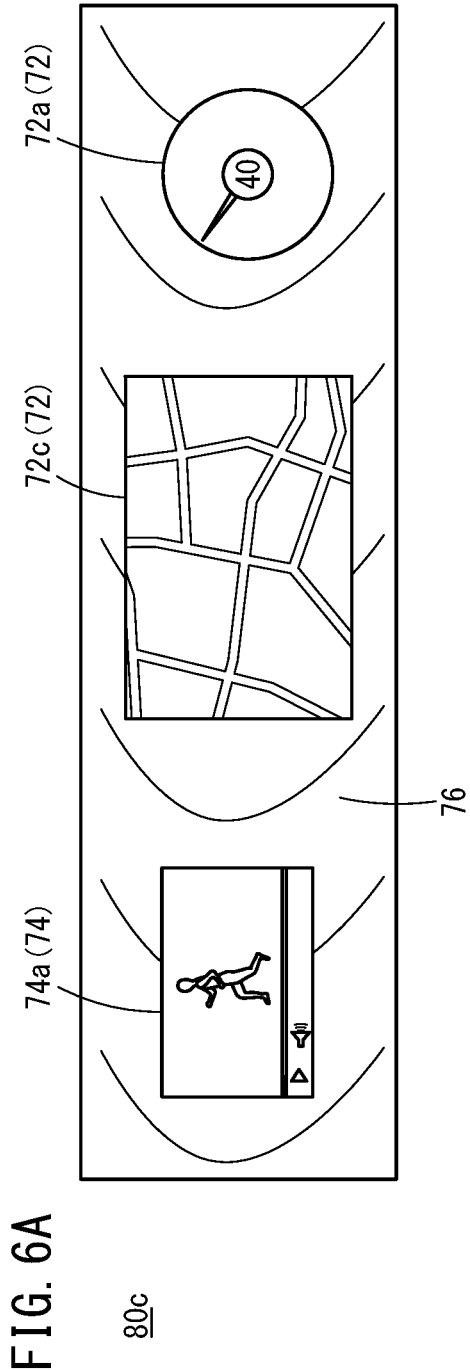
FIG. 6A is a schematic view of a third image displayed in the entirety of the screen.
Figure 6B:
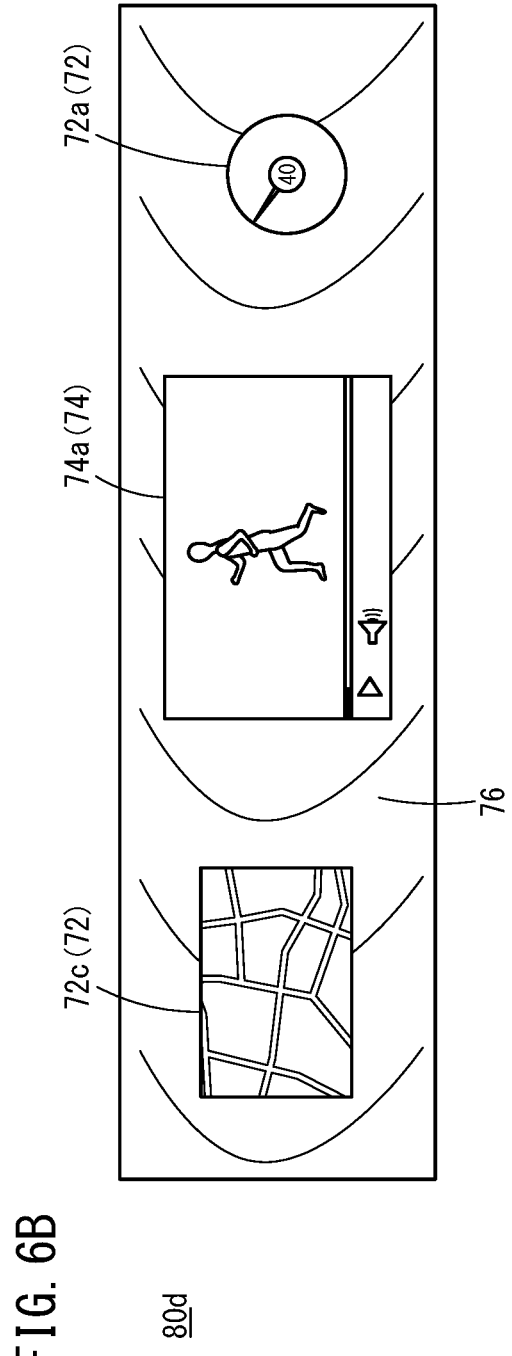
FIG. 6B is a schematic view of a fourth image displayed in the entirety of the screen.

The display control section 38 displays the third image 80c, which is shown in FIG. 6A, in the screen 52 of the display 50 when the start switch (not shown in the drawings) of the vehicle 100 is manipulated. Furthermore, when the display switching signal output by the display changeover switch 12 is detected in a state where the third image 80c is being displayed in the screen 52, the display control section 38 displays the fourth image 80d, which is shown in FIG. 6B, in the screen 52. The display control section 38 switches the display state of the screen 52 from the third image 80c to the fourth image 80d or from the fourth image 80d to the third image 80c every time the display switching signal is detected.

The third image 80c includes one or more travel information images 72 and one or more preference information images 74. In other words, the travel information image 72 and the preference information image 74 are in the displayed state. In the third image 80c, for example, the device image 72a is arranged on the right side in the vehicle width direction (in front of the ring member 62), the navigation image 72c is arranged in the center in the vehicle width direction, and the visual image 74a is arranged on the left side in the vehicle width direction (in front of the passenger seat 102p).

The fourth image 80d includes one or more travel information images 72 and one or more preference information images 74, in the same manner as the third image 80c. In other words, the travel information image 72 and the preference information image 74 are in the displayed state. In the fourth image 80d, for example, the device image 72a is arranged on the right side in the vehicle width direction (in front of the ring member 62), the visual image 74a is arranged in the center in the vehicle width direction, and the navigation image 72c is arranged on the left side in the vehicle width direction (in front of the passenger seat 102p). The display area of the device image 72a in the fourth image 80d is narrower than the display area of the device image 72a in the third image 80c. The display area of the visual image 74a in the fourth image 80d is wider than the display area of the visual image 74a in the third image 80c. The display area of the navigation image 72c in the fourth image 80d is narrower than the display area of the navigation image 72c in the third image 80c.

The display control section 38 may change only the display area of the travel information image 72 and the preference information image 74 without changing the display positions thereof, or may change only the display positions of the travel information image 72 and the preference information image 74 without changing the display areas, when the display switching signal output by the display changeover switch 12 is detected.

[2.4. Display Mode Switching Control 3]

In the present embodiment, the display control section 38 may set one of the travel information image 72 and the preference information image 74 to the displayed state and set the other to the non-displayed state, when the display switching signal output by the display changeover switch 12 is detected. Two images (a fifth image 80e and a sixth image 80f) that the display control section 38 switches between in response to detecting the display switching signal are described using FIGS. 7A and 7B.

Figure 7A:
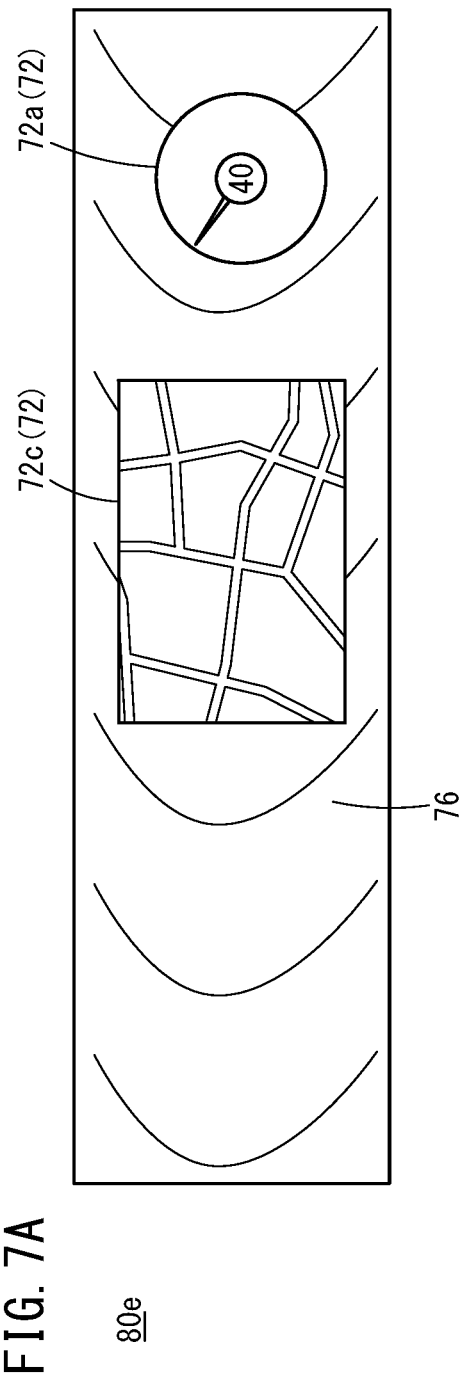
FIG. 7A is a schematic view of a fifth image displayed in the entirety of the screen.
Figure 7B:
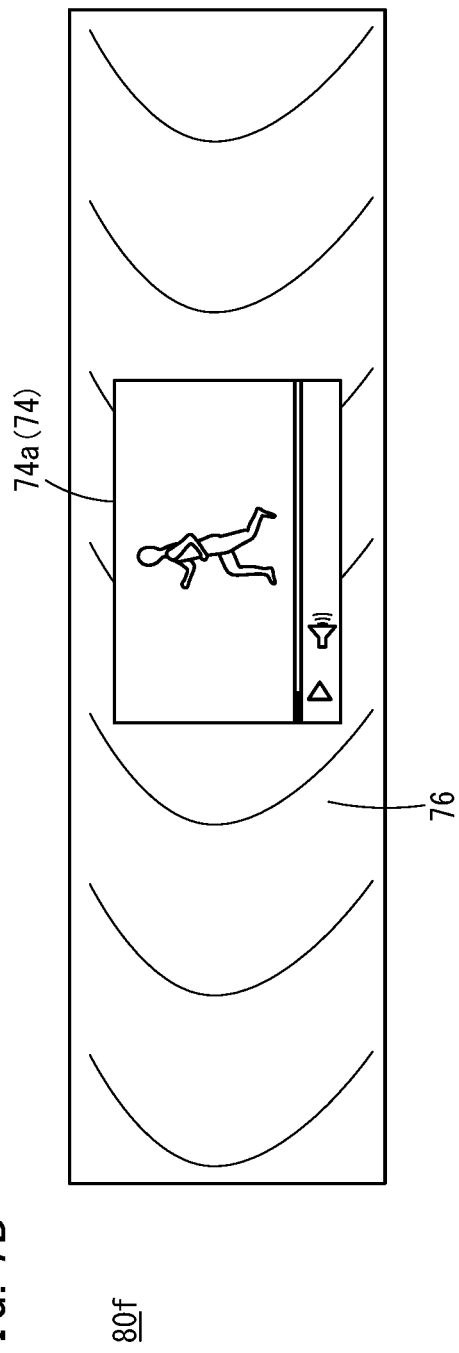
FIG. 7B is a schematic view of a sixth image displayed in the entirety of the screen.

When the start switch (not shown in the drawings) of the vehicle 100 is manipulated, the display control section 38 displays the fifth image 80e, which is shown in FIG. 7A, in the screen 52 of the display 50. When the display switching signal output by the display changeover switch 12 is detected in a state where the fifth image 80e is being displayed in the screen 52, the display control section 38 displays the sixth image 80f, which is shown in FIG. 7B, in the screen 52. Every time the display switching signal is detected, the display control section 38 switches the display state of the screen 52 from the fifth image 80e to the sixth image 80f or from the sixth image 80f to the fifth image 80e.

The fifth image 80e includes one or more travel information images 72, but does not include the preference information image 74. In other words, the travel information image 72 is in the displayed state and the preference information image 74 is in the non-displayed state. In the fifth image 80e, for example, the device image 72a is arranged on the right side in the vehicle width direction (in front of the ring member 62), and the navigation image 72c is arranged in the center in the vehicle width direction.

The sixth image 80f includes one or more preference information images 74, but does not include the travel information image 72. In other words, the preference information image 74 is in the displayed state and the travel information image 72 is in the non-displayed state. In the sixth image 80f, for example, the visual image 74a is arranged in a center position in the vehicle width direction.

[3. Modifications]

In the embodiments described above, an automated driving vehicle is envisioned as the vehicle 100. However, the display apparatus 10 is not limited to being used in an automated driving vehicle, and can be provided in a vehicle that does not perform automated driving.

In the embodiments described above, it is envisioned that the display apparatus 10 is provided in the vehicle 100. However, the display apparatus 10 is not limited to being used in the vehicle 100, and can be provided to another moving body (a train, airplane, or boat). Furthermore, the display apparatus 10 can be provided in a residential home or a facility.

The display position and display area of each image displayed in the screen 52 can be set arbitrarily. The images displayed in the screen 52 can also be set arbitrarily.

The display control section 38 may display only the wall portion image 76 in the display 50, without displaying the information image 70, when in the automated driving state or when the vehicle 100 is stopped. In this way, the entire screen 52 appears to be a portion of the instrument panel 40.

[4. Technical Concepts Obtainable from the Embodiments]

The following is a record of the technical concepts that can be understood from the embodiments and modifications described above.

An aspect of the present invention is the display apparatus 10 comprising:

the display 50 that includes the screen 52;

a wall portion (instrument panel 40) where the display 50 is attached to the attachment portion 44, and the display control section 38 configured to display the information image 70 showing information to be provided to a user (occupant), in a partial range of the screen 52 and display the wall portion image 76 having the same texture, color, or pattern as the wall portion, in a range of the screen 52 in which the information image 70 is not displayed.

According to the above configuration, the wall portion image 76 that shows the same texture, color, or pattern as the wall portion (instrument panel 40) is displayed in a range in the screen 52 where the information image 70 is not displayed. Therefore, the surface of the wall portion (in-cabin surface 42) and the screen 52 of the display 50 are harmonized. Accordingly, it is possible to improve the overall aesthetics of the display apparatus 10. Furthermore, according to the above configuration, the information image 70 showing information to be provided to the user (occupant) is displayed in a partial range of the screen 52. The screen 52 itself is not covered with the cover or the like. Accordingly, the visibility of the information image 70 is not reduced.

In the above aspect, the pattern of the wall portion (instrument panel 40) is woodgrain, and the display control section 38 may display the wall portion image 76 with a woodgrain pattern.

In the above aspect, the wall portion (instrument panel 40) may be an interior member of the vehicle 100, the information image 70 may include at least one of the travel information image 72 relating to travel of the vehicle 100 and the preference information image 74 relating to a preference of an occupant, the travel information image 72 may include at least one of the device image 72a showing a device, the warning image 72b showing warning information, and the navigation image 72c showing navigation information, and the preference information image 74 may include at least one of a visual image 74a showing information relating to the audio/visual apparatus 28 and a store information image 74b showing guidance information for a store located near the vehicle 100.

In the above aspect, the information image 70 may include the travel information image 72 and the preference information image 74, and the display control section 38 may adjust the display area or arrangement of the travel information image 72 and the preference information image 74, according to the state of the vehicle 100.

According to the above configuration, it is possible to provide suitable information to the occupant.

In the above aspect, the vehicle 100 may be configured to switch between automated driving and manual driving, the information image 70 may include the travel information image 72 and the preference information image 74, and the display control section 38 may display the travel information image 72 and not display the preference information image 74 when the driving state of the vehicle 100 is the manual driving state, and display the travel information image 72 and the preference information image 74 when the driving state of the vehicle is the automated driving state (2.2. Display Mode Switching Control 1).

According to the above configuration, it is possible to provide suitable information to the occupant.

In the above aspect, the display apparatus 10 includes the display changeover switch 12 that is manipulated by the occupant, the information image 70 includes the travel information image 72 and the preference information image 74, and the display control section 38 may switch the display positions of the travel information image 72 and the preference information image 74 when manipulation of the display changeover switch 12 is detected in a state where the travel information image 72 and the preference information image 74 are being displayed (2.3. Display Mode Switching Control 2).

According to the above configuration, it is possible to suitably provide information requested by the occupant.

In the above aspect, the display apparatus 10 includes the display changeover switch 12 that is manipulated by the occupant, wherein the information image 70 may include the travel information image 72 and the preference information image 74, and when manipulation of the display changeover switch 12 is detected in a state where one of the travel information image 72 and the preference information image 74 is being displayed, the display control section 38 may set the image, among the travel information image 72 and the preference information image 74, that was displayed before the manipulation of the display changeover switch 12 not to be displayed, and display the image, among the travel information image 72 and the preference information image 74, that was not displayed before the manipulation of the display changeover switch 12 (2.4. Display Mode Switching Control 3).

According to the above configuration, it is possible to suitably provide information requested by the occupant.

In the above aspect, the wall portion may be the instrument panel 40.

In the above aspect, the screen 52 may be arranged deeper than the surface (in-cabin surface 42) of the wall portion (instrument panel 40), and a region (adjacent region 56) of the screen 52 adjacent to the surface of the wall portion may be covered with the transparent member 60 that transparently passes light.

According to the above configuration, it is possible to eliminate a step or the level difference between the screen 52 of the display 50 and the surface (in-cabin surface 42) of the wall portion (instrument panel 40), by the transparent member 60. Accordingly, the border between the screen 52 of the display 50 and the surface of the wall portion does not stand out.

In the above aspect, the transparent member 60 may become thinner toward the center of the screen 52.

According to the above configuration, it is possible to eliminate the level difference of the transparent member 60 itself. Accordingly, the border between the screen 52 of the display 50 and the surface (in-cabin surface 42) of the wall portion (instrument panel 40) stands out even less.

In the above aspect, the display apparatus 10 may include the ring member 62 arranged on the front surface of the screen 52.

According to the above configuration, when the occupant views the screen 52, the attention of the occupant can be drawn to the image displayed in front of the ring member 62.

In the above aspect, the central axis A of the ring member 62 may intersect with the screen 52, and the display control section 38 may be configured to display the travel information image 72 in a range including the position where the central axis A and the screen 52 intersect.

According to the above configuration, when the occupant views the screen 52, the attention of the occupant can be drawn to the travel information image 72 displayed in front of the ring member 62.

The display apparatus according to the present invention is not limited to the embodiments described above, and it is obvious that various configurations can be adopted without deviating from the gist of the present invention.

What is claimed is:

1. A display apparatus comprising:
   a display that includes a screen;
   a wall portion where the display is attached to an attachment portion;
   a display control section configured to display an information image showing information to be provided to a user in a partial range of the screen, and display a wall portion image having the same texture, color, or pattern as the wall portion, in a range of the screen in which the information image is not displayed; and
   a display changeover switch that is manipulated by the occupant,
   wherein the wall portion is an interior member of a vehicle,
   the information image includes a travel information image relating to travel of the vehicle and a preference information image relating to a preference of an occupant,
   the travel information image includes at least one of a device image showing a device, a warning image showing warning information, and a navigation image showing navigation information, and
   the preference information image includes at least one of a visual image showing information relating to an audio/visual apparatus and a store information image showing guidance information for a store located near the vehicle, and
   the display control section causes the travel information image and the preference information image to swap display positions when manipulation of the display changeover switch is detected in a state where the travel information image and the preference information image are being displayed.

2. The display apparatus according to claim 1, wherein the pattern of the wall portion is woodgrain, and
   the display control section displays the wall portion image with a woodgrain pattern.

3. The display apparatus according to claim 1, wherein the information image includes the travel information image and the preference information image, and
   the display control section adjusts a display area or an arrangement of the travel information image and the preference information image, according to a state of the vehicle.

4. The display apparatus according to claim 1, wherein the vehicle is configured to switch between automated driving and manual driving,
   the image information includes the travel information image and the preference information image, and
   the display control section displays the travel information image and does not display the preference information image when a driving state of the vehicle is a manual driving state, and displays the travel information image and the preference information image when the driving state of the vehicle is an automated driving state.

5. The display apparatus according to claim 1, comprising a display changeover switch that is manipulated by the occupant,
   wherein the information image includes the travel information image and the preference information image, and
   when manipulation of the display changeover switch is detected in a state where one of the travel information image and the preference information image is being displayed, the display control section sets the image, among the travel information image and the preference information image, that was displayed before the manipulation of the display changeover switch not to be displayed, and displays the image, among the travel information image and the preference information image, that was not displayed before the manipulation of the display changeover switch.

6. The display apparatus according to claim 1, wherein the wall portion is an instrument panel.

7. The display apparatus according to claim 1, wherein the screen is arranged deeper than a surface of the wall portion, and
   a region of the screen adjacent to the surface of the wall portion is covered with a transparent member that transparently passes light.

8. The display apparatus according to claim 7, wherein the transparent member becomes thinner toward a center of the screen.

9. The display apparatus according to claim 1, comprising a ring member arranged on a front surface of the screen.

10. The display apparatus according to claim 9, wherein a central axis of the ring member intersects with the screen, and
    the display control section is configured to display the travel information image in a range including a position where the central axis and the screen intersect.

* * * * *